United States Patent
You et al.

(10) Patent No.: US 11,240,777 B2
(45) Date of Patent: Feb. 1, 2022

(54) DEVICE POSITIONING METHOD AND APPARATUS

(71) Applicant: TENCENT TECHNOLOGY (SHENZHEN) COMPANY LIMITED, Shenzhen (CN)

(72) Inventors: Fei You, Shenzhen (CN); Yong Yang, Shenzhen (CN); Yuanbin Chen, Shenzhen (CN); Meng Chen, Shenzhen (CN); Xuan Zong, Shenzhen (CN); Feifei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 20 days.

(21) Appl. No.: 16/365,124

(22) Filed: Mar. 26, 2019

(65) Prior Publication Data

US 2019/0223141 A1 Jul. 18, 2019

Related U.S. Application Data

(63) Continuation of application No. PCT/CN2018/086792, filed on May 15, 2018.

(30) Foreign Application Priority Data

May 17, 2017 (CN) .......................... 201710345737.0

(51) Int. Cl.
*H04W 64/00* (2009.01)
*H04W 8/20* (2009.01)
(Continued)

(52) U.S. Cl.
CPC ............ *H04W 64/003* (2013.01); *G01S 5/00* (2013.01); *G01S 5/0284* (2013.01); *H04W 8/20* (2013.01); *H04W 8/24* (2013.01)

(58) Field of Classification Search
CPC ... H04W 4/029; H04W 64/00; H04W 64/003; H04W 8/20; H04W 8/24; G01S 5/00; G01S 5/0284
See application file for complete search history.

(56) References Cited

U.S. PATENT DOCUMENTS

2008/0200181 A1* 8/2008 Zill ..................... H04L 41/0886
455/456.1
2011/0167440 A1* 7/2011 Greenfield ............ H04L 63/102
725/25

(Continued)

FOREIGN PATENT DOCUMENTS

CN 103220623 A 7/2013
CN 104105064 A 10/2014
(Continued)

OTHER PUBLICATIONS

International Search Report dated Jul. 26, 2018 in PCT/CN2018/086792, with English translation.
Written Opinion dated Jul. 26, 2018 in PCT/CN2018/086792.

*Primary Examiner* — Margaret G Mastrodonato
(74) *Attorney, Agent, or Firm* — Oblon, McClelland, Maier & Neustadt, L.L.P.

(57) ABSTRACT

Aspects of the disclosure provide a device positioning method and apparatus. The apparatus includes processing circuitry. The processing circuitry is configured to determine at least one target user identifier (ID) that uses a target device to be positioned. The processing circuitry obtains a plurality of pieces of login information of the at least one target user ID where each piece of login information includes the respective target user ID, a device ID of a login device, and a login site. The processing circuitry further determines a target login site based on the plurality of pieces of login information, and positions the target device according to the target login site.

20 Claims, 4 Drawing Sheets

(51) Int. Cl.
  *H04W 8/24*  (2009.01)
  *G01S 5/00*  (2006.01)
  *G01S 5/02*  (2010.01)

(56) References Cited

U.S. PATENT DOCUMENTS

| | | | | |
|---|---|---|---|---|
| 2011/0271340 | A1* | 11/2011 | Vaidyanathan | H04L 63/1416 726/22 |
| 2012/0102169 | A1* | 4/2012 | Yu | H04L 67/18 709/223 |
| 2013/0262311 | A1* | 10/2013 | Buhrmann | G06Q 20/40 705/44 |
| 2015/0119084 | A1 | 4/2015 | He et al. | |
| 2015/0215762 | A1* | 7/2015 | Edge | H04W 4/02 370/338 |
| 2017/0070525 | A1* | 3/2017 | Bailey | G06F 16/24578 |
| 2017/0171713 | A1 | 6/2017 | Hou et al. | |
| 2017/0180927 | A1 | 6/2017 | Ding et al. | |

FOREIGN PATENT DOCUMENTS

| | | |
|---|---|---|
| CN | 105491524 A | 4/2016 |
| CN | 105578411 A | 5/2016 |

* cited by examiner

DEVICE POSITIONING METHOD AND APPARATUS

RELATED APPLICATION

This application is a continuation of International Application No. PCT/CN2018/086792, filed on May 15, 2018, which claims priority to China Patent Application No. 201710345737.0, entitled "Device Positioning Method and Apparatus" filed on May 17, 2017. The entire disclosures of the prior applications are hereby incorporated by reference in their entirety.

FIELD OF THE TECHNOLOGY

This application relates to the field of computer technologies

BACKGROUND OF THE DISCLOSURE

With the continuous development of network technologies, types and functions of network applications grow increasingly. In combination with a gradually maturing positioning technology, a geographic location service is developed in many network applications, so that application services, such as online meal ordering and shopping, are better carried out according to real geographic locations of users Currently, most network applications obtain location information of terminals (that is, users) by replying on built-in Global Positioning System (GPS) modules of the terminals. However, in many cases, users may disable GPS permissions of some of network applications. Moreover, some terminals, such as a personal computer (PC) and a notebook computer, are not equipped with GPS modules. As a result, network applications cannot implement positioning by obtaining GPS information, and are severely restricted. In view of such a case, positioning of a communications terminal can be implemented by using an Internet Protocol (IP) address for Internet access of the communications terminal. However, IP information is easy to forge. For example, lawbreakers usually forge geographic location information to seek illegal interests from services, for example, carry out activities such as brushing, fraud, and pornographic fake chatting. Therefore, if positioning is performed merely by using IP information, it is difficult to correctly identify real geographic locations of users, and the accuracy is relatively low.

SUMMARY

Aspects of the disclosure provide a device positioning method and apparatus, which can improve the accuracy of device positioning.

Aspects of the disclosure provide the device positioning method and apparatus. The apparatus includes processing circuitry. The processing circuitry is configured to determine at least one target user identifier (ID) that uses a target device to be positioned. The processing circuitry obtains a plurality of pieces of login information of the at least one target user ID where each piece of login information includes the respective target user ID, a device ID of a login device, and a login site. The processing circuitry further determines a target login site based on the plurality of pieces of login information, and positions the target device according to the target login site.

In some embodiments, for each piece of login information that includes the respective target user ID, the device ID, and the login site, the processing circuitry obtains, based on the device ID, a first weight for the target user ID where the first weight indicates the login device being used by a set of user IDs including the target user ID. The processing circuitry calculates, according to the first weight, a credibility level of the respective login site associated with the respective piece of login information, and determines the target login site according to the credibility levels of the respective login sites associated with the plurality of pieces of login information.

In some examples, for each login site that is included in one or more of the plurality of pieces of login information, the processing circuitry determines a combined credibility level based on the one or more credibility levels of the respective login sites associated with the one or more of the plurality of pieces of login information. Further, the processing circuitry selects the login site corresponding to the largest combined credibility level as the target login site.

In some examples, each piece of login information further includes an application ID of an application program. The processing circuitry obtains, based on the target user ID, a second weight for the respective application ID, and calculates the credibility level according to the first weight and the second weight.

In some examples, the plurality of pieces of login information includes one or more pieces of target login information, the login device of the one or more pieces of target login information being the target device. The processing circuitry calculates the credibility level of the respective login site according to the first weight and the second weight for each of the one or more pieces of target login information.

In some examples, the processing circuitry obtains, based on the target user ID, a third weight for the device ID, the third weight indicating the target user ID using a set of devices including the login device, and calculates the credibility level of the respective login site according to the first weight, the second weight, and the third weight.

In some embodiments, the processing circuitry further obtains a device positioning request that includes a target device ID for the target device. The processing circuitry determines the at least one target user ID based on the target device ID. In some examples, before the determining the at least one target user ID, the processing circuitry obtains multiple user IDs that log into the target device within a preset time and determines one or more candidate user IDs from the multiple user IDs based on usage of the target device by the one or more candidate user IDs. The processing circuitry establishes an association relationship between the target device ID and the one or more candidate user IDs and stores the association relationship in an identifier library. In some examples, the processing circuitry obtains, according to the association relationship in the identifier library, the one or more candidate user IDs associated with the target device ID where the one or more candidate user IDs is the at least one target user ID. In an example, the processing circuitry calculates a login duration of each of the multiple user IDs on the target device within the preset time and sorts the multiple user IDs according to the respective login durations. The processing circuitry determines the one or more candidate user IDs corresponding to N longest login durations in the sorted multiple user IDs where N is a positive integer.

Aspects of the disclosure also provide a non-transitory computer-readable storage medium storing instructions which when executed by a computer cause the computer to perform the device positioning method.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DESCRIPTION OF EMBODIMENTS

Technical solutions of the embodiments of this application are described clearly and completely with reference to the accompanying drawings of the embodiments of this application. The described embodiments are merely some embodiments rather than all embodiments of this application. Based on the embodiments in this application, all other embodiments obtained by a person skilled in the art fall within the protection scope of this application.

Embodiments of this application provide a device positioning method and apparatus, which are described in detail in the following respectively.

Figure 1:
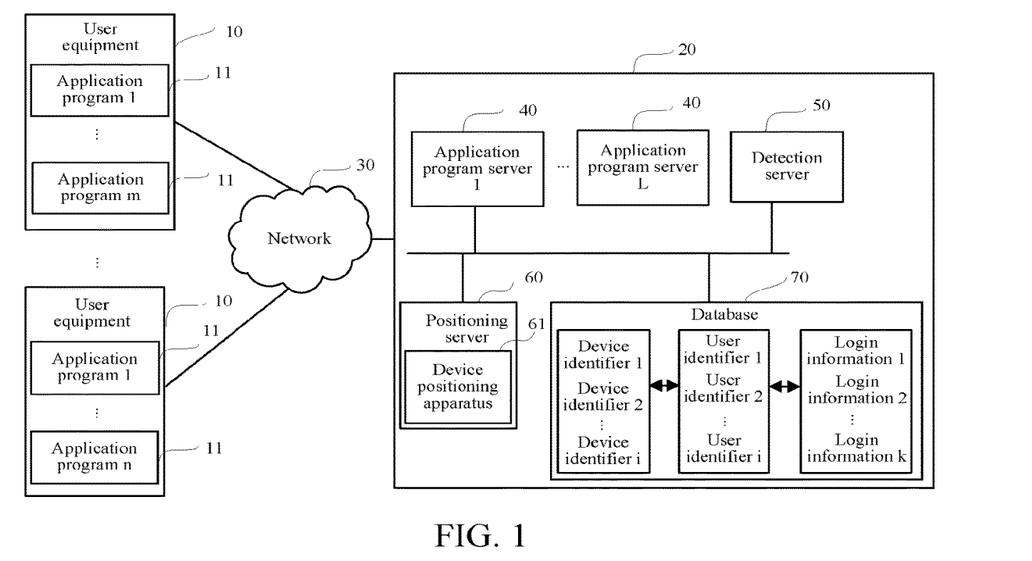
FIG. 1 is a schematic diagram of an implementation environment of a device positioning method according to an embodiment of this application.

FIG. 1 is a schematic diagram of an implementation environment of a device positioning method according to an embodiment of this application. The implementation environment includes user equipment 10 (or a plurality of user equipment 10) and a server system 20 interacting with the user equipment 10. In the following text, the server system 20 is also referred to as a system or a server. The plurality of user equipment 10 is connected to the server system 20 through a wired or wireless network 30. The user equipment 10 may be an electronic device, such as a computer, a smart phone, a tablet computer or other electronic devices, capable of accessing the server system 20, and application programs are installed in the user equipment 10. A plurality of application programs may be installed in one user equipment, and each application program may be used by a plurality of users. The server system 20 may include an application program server 40, configured to communicate with an application program 1 on the user equipment 10, a detection server 50, configured to detect whether to position a particular user equipment, and a positioning server 60, configured to position the user equipment. The system 20 may further include a database 70, configured to store various data of users and user equipment, for example, user identifiers, device identifiers, and login information. In FIG. 1, for ease of description, the database 70 is shown as an independent part, and the database 70 may also be distributed in various application program servers. The positioning server 60 may include a device positioning apparatus 61, configured to obtain a device positioning request, the device positioning request carrying a target device identifier. For example, the device positioning request is sent by the detection server 50. The device positioning apparatus 61 determines at least one target user identifier according to the target device identifier, and obtains at least one piece of login information reported by each target user identifier. Each piece of login information includes the target user identifier, a device identifier of a login device, a login site, and other information. Subsequently, the device positioning apparatus 61 determines a target login site according to the target user identifier and the device identifier in each piece of login information, and positions the target device according to the target login site. Various servers in the system 20 are merely divided based on functions, and the servers may also be integrated together.

This embodiment of this application is described from the perspective of a device positioning apparatus. The device positioning apparatus specifically may be implemented as an independent entity, or may be implemented by being integrated in another device, such as a server. The server may be an integration of a plurality of servers. The device positioning apparatus may perform a device positioning method including, for example, obtaining a device positioning request, the device positioning request carrying a target device identifier of a to-be-positioned device (also referred to as a target device that is to be positioned). The device positioning method can also include determining at least one target user identifier according to the target device identifier and obtaining at least one piece of login information reported by each target user identifier where each piece of login information includes the target user identifier, a device identifier of a login device, and a login site. The device positioning method then determines a target login site according to the target user identifier and the device identifier in each piece of login information. The device positioning method can further position the to-be-positioned device according to the target login site.

Figure 2A:
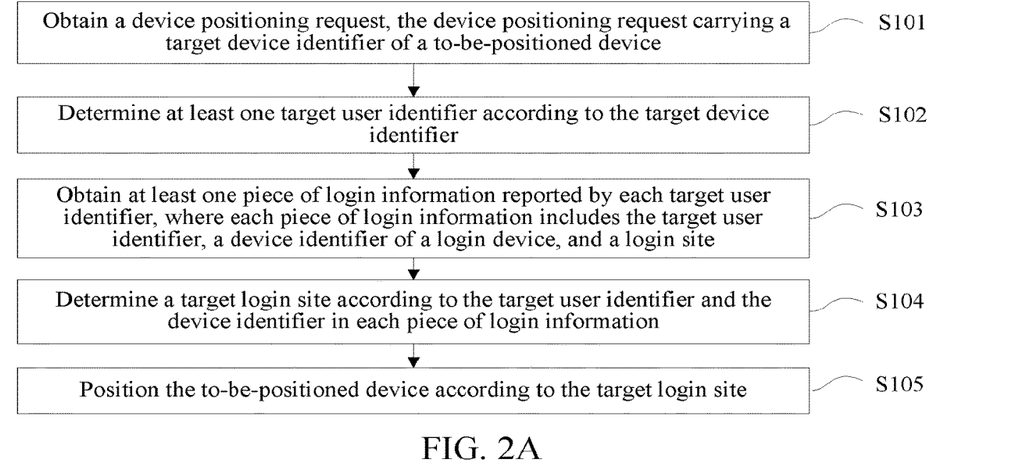
FIG. 2A is a schematic flowchart of a device positioning method according to an embodiment of this application.

FIG. 2A is a schematic flowchart of a device positioning method according to an embodiment of this application. As shown in FIG. 2A, a specific process of the device positioning method may be as follows:

In step S101, obtain a device positioning request, the device positioning request carrying a target device identifier of a to-be-positioned device.

In some embodiments, the target device identifier (device identifier) is a unique identifier of the device, and may be an International Mobile Equipment Identity (TMEI) of the device, a device fingerprint, or a character string that is automatically allocated by a system to each device when an application program on the device is used. The device fingerprint herein is usually formed according to hardware information (such as a device brand or model) and network browsing information of each device, and different devices have different device fingerprints. For example, when a detection server in the system detects that a device reports different login sites to an application program server in a process of using different application programs, the device may be determined as a to-be-positioned device. In this case, the device positioning request may be generated and sent to the device positioning apparatus. The device positioning apparatus obtains the device positioning request, to position the device.

In step S102, determine at least one target user identifier according to the target device identifier.

In some embodiments, the target user identifier (user identifier) is an identifier for identifying a user, and the same user usually has different user identifiers in different application systems. The user identifier may be an account registered by a user on a server in an application system in a process of using an application program, or may be a character string allocated by the server in the application system to each user, or the like. The at least one target user identifier may be user identifiers of the same user in different application programs on the target device corresponding to the target device identifier, or may be user identifiers of different users in the same application program on the target device corresponding to the target device identifier.

For example, the foregoing step S102 specifically may include the following step:

The device positioning apparatus searches an identifier library for each user identifier corresponding to the target device identifier as the target user identifier.

In some embodiments, identifiers in the identifier library may include user identifiers and device identifiers. The user identifiers may be associated with the device identifiers. Each device identifier may correspond to at least one user identifier, and each user identifier may correspond to at least one device identifier. Specific quantities may be determined according to an actual requirement.

The identifier library may be set in advance, and may also be referred to as a database. That is, before the foregoing step S102, the device positioning method may further include the following steps:

In step 1-1, obtain all user identifiers that log into the to-be-positioned device within a preset time.

In some embodiments, the preset time may be determined according to an actual requirement. For example, the preset time may be one month or two months. Generally, the server may automatically record a status each time a user logs into an application system, for example, a login device, a login period, a login account, and a login application program, and store the recorded status in the identifier library. The device positioning apparatus may obtain, from the identifier library, all user identifiers that log into the to-be-positioned device within the preset time.

In step 1-2, determine one or more candidate user identifiers from the user identifiers.

For example, the foregoing step 1-2 specifically may include calculating a total login duration (or a login duration) of each user identifier on the to-be-positioned device within the preset time, sorting the user identifiers according to a value of each total login duration, and obtaining a preset quantity of top user identifiers in the sorted user identifiers as the one or more candidate user identifiers.

In some embodiments, the preset quantity may be determined according to an actual requirement, for example, 3 or 4. For example, the device positioning apparatus may add up all login periods of a particular user identifier within the preset time, to obtain a total login duration of the user identifier. Then, user identifiers with total login durations ranked in the front several positions may be determined as the one or more candidate user identifiers. Generally, a user identifier with a longer total login duration is more likely a user identifier of an owner of the to-be-positioned device, for example, a user identifier of a main user of the to-be-positioned device. Login statuses (which are mainly login sites) of the user identifiers have an important reference value in the subsequent process of determining a home area of the device.

In step 1-3, establish an association relationship between the target device identifier and each of the one or more candidate user identifiers, and store the association relationship in the identifier library.

In some embodiments, each device identifier may be associated with a plurality of user identifiers. Each user identifier is a main use identifier of a device indicated by the device identifier. The user identifiers may be registered accounts of the same user or different users on different application programs. The different application programs are usually developed by one operator.

In this case, the foregoing step of "searching an identifier library for each user identifier corresponding to the target device identifier as the target user identifier" may include obtaining, from the identifier library and according to the association relationship between the target device identifier and each of the one or more candidate user identifiers, each user identifier corresponding to the target device identifier as the target user identifier.

In some embodiments, the device identifier of each device is associated with corresponding user identifiers, so that the device positioning apparatus can find a corresponding user identifier according to a device identifier subsequently.

In step S103, obtain at least one piece of login information reported by each target user identifier, where each piece of login information may include the target user identifier, a device identifier of a login device, and a login site.

In some embodiments, the login information mainly refers to information related to user login, for example, a login account (that is, a login user identifier), a login device, a login application program, a login period, and a login site. The login site may be a positioning site of a built-in GPS of the device, or may be a site obtained according to an IP address of the device. The login site may be specifically determined according to an actual requirement. Generally, GPS information cannot be forged easily, in some examples, a GPS positioning site may be used as the login site preferably. In an example, the login site is determined according to the IP address only when a GPS function cannot be used.

In step S104, determine a target login site according to the target user identifier and the device identifier in each piece of login information.

For example, the foregoing step S104 may specifically include the following steps:

In step 2-1, obtain a first weight value (or a first weight) of the corresponding target user identifier according to the device identifier in each piece of login information.

In some embodiments, the first weight value is mainly used for indicating a degree of importance of each user identifier with respect to a device, and may be set in advance according to a use frequency and/or a login duration of each user identifier on the same device. For example, the first weight value can indicate that the device is used by a set of user identifiers including the target user identifier. Generally, for different user identifiers appearing on the same device, a higher use frequency or a longer login duration of a user identifier indicates that the user identifier is more important for the device, for example, the first weight value is greater.

In step 2-2, to calculate a confidence level (or a credibility level) of the corresponding login site according to the first weight value corresponding to each piece of login information.

In some embodiments, the confidence level mainly refers to a degree of credibility that a site where the device is located (that is, a home area) is the corresponding login site. The confidence level may be determined in many manners.

For example, the confidence level may be directly calculated according to the first weight value, for example, the confidence level is directly calculated according to the use frequency and login duration of each user identifier on the device. Generally, a login site corresponding to a user identifier with a higher use frequency or a longer login period has a higher level of confidence of being the home area of the device. Therefore, the home area of the device may be determined according to login statuses of a plurality of users on the same device. Compared with a related method of determining a home area of a device merely according to a login status of a single user, the device positioning method in some embodiments can effectively avoid the problem of a positioning error caused by forged login information of a single user, thereby improving the accuracy of positioning.

Definitely, to further ensure the accuracy of positioning, positioning may be performed from multiple dimensions. For example, the confidence level may be calculated with reference to service data of services that the device participates in. That is, the login information may further include an application identifier of a login application program. In this case, the foregoing step 2-2 may specifically include the following steps:

In step 2-2-1, to obtain a second weight value of the corresponding application identifier according to the target user identifier in each piece of login information.

In some embodiments, the application identifier is a unique identifier of an application program, and may be a name of the application program. Different application programs have different application identifiers. The second weight value is mainly used for indicating a degree of importance of each application program with respect to a user, and may be set in advance according to a factor (such as a usage habit) of the user. For example, a second weight value of an application program used more frequently may be set to a larger value. Definitely, the second weight value may also be set with reference to a factor of the application program (for example, a real name degree). Generally, login information reported by an application program with a higher real name degree is more difficult to forge, and has a higher reference value for determining a home area of the device. Therefore, the second weight value may be directly proportional to the real name degree. For example, for application programs with gradually descending real name degrees, such as a payment-type application program, a social-type application program, and a video-type application program, weight values thereof may also be set in descending order.

Because different users have different usage habits, for the same application program, different users have different second weight values. In addition, the second weight value not only can be determined according to the factor of the user or the factor of the user and the factor of the application program, but also can be determined according to the factor of the application program directly, and in this case, for the same application program, different users have the same second weight value.

In step 2-2-2, calculate the confidence level of the corresponding login site according to the first weight value and the second weight value corresponding to each piece of login information.

In some embodiments, the target login site may be directly determined according to the login information reported by the target user identifier in the to-be-positioned device, or the target login site may be determined with reference to login information reported by target user identifiers in other devices. Definitely, there may also be other determining manners. The calculation method may be determined according to an actual requirement. For example, the calculation method may be simple multiplication, addition, and the like.

For example, when the target login site is determined merely according to the login information reported by the to-be-positioned device, the foregoing step 2-2-2 may include obtaining the login information corresponding to the target device identifier as target login information, and calculating the confidence level of the corresponding login site according to the first weight value and the second weight value corresponding to each piece of target login information.

In some embodiments, each target user identifier may report login sites in a plurality of devices. Therefore, when a home area of the to-be-positioned device needs to be analyzed, the target login site may be directly determined according to the login information reported by the to-be-positioned device. That is, the login information is directly determined according to the second weight value of the login application program in the target login information and the first weight value of the login user. This determining method combines two dimensions, for example, service data and a user factor, and is more accurate in positioning compared with a single-dimensional determining method. Moreover, this determining method helps implement data sharing between different services and breaks down information barriers.

Specifically, when the target login site is determined according to login information reported by target user identifiers in the to-be-positioned device and other devices, the foregoing step 2-2-2 may specifically include the following steps obtaining a third weight value of the corresponding device identifier according to the target user identifier in each piece of login information, and calculating the confidence level of the corresponding login site according to the first weight value, the second weight value, and the third weight value corresponding to each piece of login information.

In some embodiments, the third weight value is mainly used for indicating a degree of importance of each device with respect to a user, and may be set in advance according to a login frequency and/or a login duration of the same user identifier on each device. Generally, for the same user identifier, a third weight value of a mainly used device (for example, a device that is logged into for the most number of times or logged in for the longest duration) may be set to a relatively large value, and a device not mainly used (for example, a device that is logged into only once) may be set to a relatively small value. This determining method implements positioning by combining three dimensions, for example, service data, a user factor, and a device factor, and can effectively distinguish false login information and improve the accuracy of device positioning.

The third weight value is set in advance according to a historical login status of each user identifier on each device. Therefore, a user identifier may log into a new device subsequently. In this case, because historical login devices do not include the new device, the corresponding third weight value cannot be obtained. In such a case, the third weight value of each new device may be 0 or a relatively small fixed value by default.

In step 2-3, determine the target login site according to the confidence level of each login site.

For example, the foregoing step 2-3 may specifically include the following step accumulating confidence levels in the login information that belong to the same login site to obtain an accumulated confidence level (or a combined credibility level) where each login site corresponding to one accumulated confidence level and determining the login site corresponding to the largest accumulated confidence level as the target login site.

In some embodiments, all confidence levels corresponding to the same login site may be added up to obtain a total confidence level (that is, the accumulated confidence level). A larger value of the confidence level indicates that the login site is more likely a current site (that is, the home area) of the to-be-positioned device. Therefore, the login site corresponding to the largest confidence level may be directly determined as the target login site.

In step 105, position the to-be-positioned device according to the target login site.

In some embodiments, the target login site may be directly determined as the current site of the to-be-positioned device, thereby implementing precise positioning of the to-be-positioned device. In addition, login information in which the login site is not the target login site may further be determined as false information preliminarily, thereby effectively preventing lawbreakers from forging geographic location information to seek illegal interests from services, for example, carry out brushing, fraud, and pornographic fake chatting. Therefore, a good network environment can be maintained.

It can be learned from foregoing description that in the device positioning method provided in some embodiments, a device positioning request is obtained, the device positioning request carrying a target device identifier of a to-be-positioned device; then, at least one target user identifier is determined according to the target device identifier, and at least one piece of login information reported by each target user identifier is obtained, each piece of login information including the target user identifier, a device identifier of a login device, and a login site; then, a target login site is determined according to the target user identifier and the device identifier in each piece of login information, and the to-be-positioned device is positioned according to the target login site. Therefore, device positioning can be implemented from multiple dimensions, and high accuracy is achieved.

According to the method described in the foregoing embodiment, a further detailed description is made below by using an example.

In some embodiments, a detailed description is made by using an example in which a device positioning apparatus is integrated in a server.

Figure 2B:
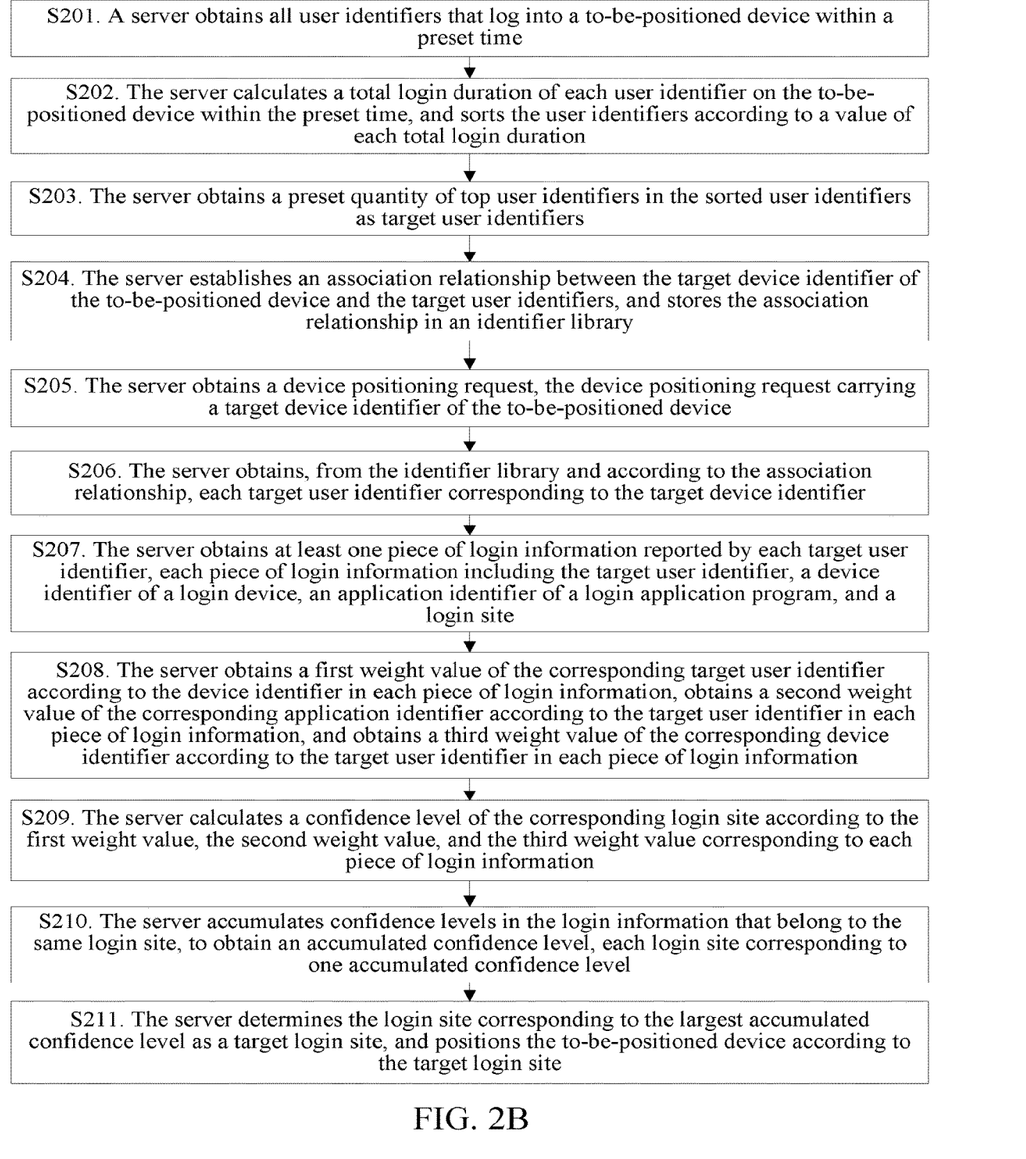
FIG. 2B is a schematic flowchart of a device positioning method according to an embodiment of this application.

As shown in FIG. 2B, a specific process of a device positioning method may be as follows:

In step S201, a server obtains all user identifiers that log into a to-be-positioned device within a preset time.

Figure 2C:
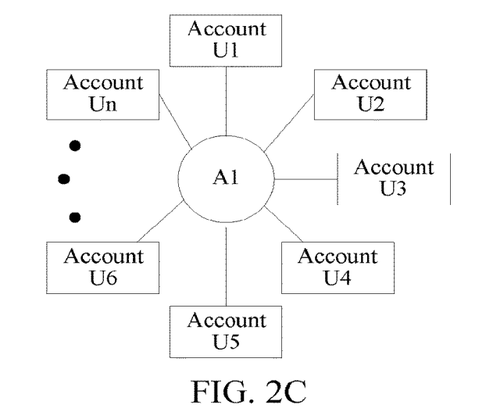
FIG. 2C is a schematic diagram of device clustering for an account according to an embodiment of this application.

For example, the preset time may be 60 days. The to-be-positioned device may be A1. The user identifiers may be user accounts that are registered by a user in a plurality of application systems corresponding to the to-be-positioned device, for example, U1, U2 . . . , Un, where n is a positive integer. For details, refer to FIG. 2C.

In step S202, the server calculates a total login duration, within the preset time, of each user identifier on the to-be-positioned device, and sorts the user identifiers according to a value of each total login duration.

For example, the server may add up each login duration of each user identifier Ui on the to-be-positioned device A1, to obtain a total login duration, and then each user identifier Ui is sorted in descending order of the login duration, to obtain the sorted user identifiers {U1, U2 . . . , Un}, where i is a positive integer between 1 and n.

In step S203, the server obtains a preset quantity of top user identifiers in the sorted user identifiers as target user identifiers.

For example, the preset quantity may be set to 3. In this case, the server may determine {U1, U2, U3} as target user identifiers.

In step S204, the server establishes an association relationship between the target device identifier of the to-be-positioned device and the target user identifiers, and stores the association relationship in an identifier library.

For example, the identifier library may store an association relationship between each user identifier of all registered user identifiers in the server platform and device identifiers of devices that the user identifiers have logged into, so that a corresponding user identifier can be found according to a device identifier subsequently.

In step S205, the server obtains a device positioning request, the device positioning request carrying a target device identifier of the to-be-positioned device.

For example, when the server detects that a specific device reports a plurality of login sites and the login sites are obtained according to IP addresses and a GPS, a device positioning request may be generated for the device. For example, in the device A1, if a login site reported by a user identifier U1 is P1 and a login site reported by a user identifier Ui is P2, the device A1 may be determined as the to-be-positioned device, and the device positioning request is generated.

In step S206, the server obtains, from the identifier library and according to the association relationship, each target user identifier corresponding to the target device identifier.

For example, the server may find, in the identifier library, target user identifiers {U1, U2, U3} according to the target device identifier A1.

In step S207, the server obtains at least one piece of login information reported by each target user identifier, each piece of login information including the target user identifier, a device identifier of a login device, an application identifier of a login application program (or an application program), and a login site.

For example, the server may obtain all login information reported by U1, U2, and U3 respectively.

In step S208, the server obtains a first weight value of the corresponding target user identifier according to the device identifier in each piece of login information, obtains a second weight value (or a second weight) of the corresponding application identifier according to the target user identifier in each piece of login information, and obtains a third weight value (or a third weight) of the corresponding device identifier according to the target user identifier in each piece of login information. For example, the third weight value can indicate that the target user identifier uses a set of devices including the login device having the device identifier.

For example, the server may collect, in advance, statistics about historical login application programs and historical login devices reported by U1, U2, and U3, then set a third weight value of each historical login device with respect to U1, U2, or U3 according to a login frequency and/or duration of U1, U2, or U3 on each historical login device, set a second weight value according to a real name degree of each historical login application program, and set, according to a login frequency and/or duration of U1, U2, or U3 on the to-be-positioned device, a first weight value of U1, U2, or U3 with respect to the to-be-positioned device. The server stores the first weight value, the second weight value, and the third weight value, so that the stored first weight value, second weight value, and third weight value can be directly obtained subsequently.

In step S209, the server calculates a confidence level of the corresponding login site according to the first weight value, the second weight value, and the third weight value corresponding to each piece of login information.

Figure 2D:
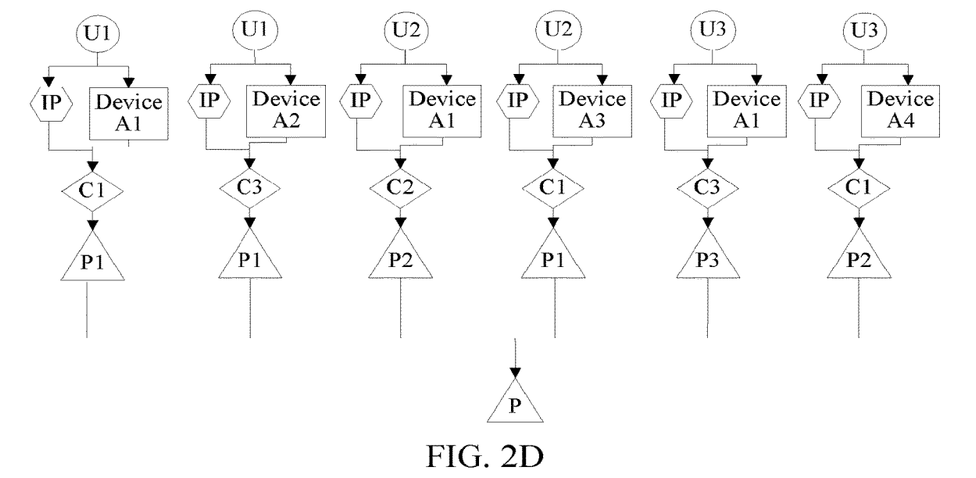
FIG. 2D is a schematic frame diagram of a device positioning method according to an embodiment of this application.

For example, it is assumed that second weight values of application programs C1, C2, and C3 are a, b, and c respectively; the first weight values of U1, U2, and U3 with respect to the to-be-positioned device A1 are 1, 0.9, and 0.8 respectively. For details, refer to FIG. 2D. In the following login information,

- if U1 reports a login site P1 through the social application C1 on the device A1, where the third weight value of A1 with respect to U1 is 1, the confidence level of P1 may be 1*1*a;
- if U1 reports a login site P1 through the payment application C3 on the device A2, where the third weight value of A2 with respect to U1 is 1 and the first weight value of A2 is 0.8, the confidence level of P1 may be 1*0.8*c,
- if U2 reports a login site P2 through the game application C2 on the device A1, where the third weight value of A1 with respect to U2 is 1.2, the confidence level of P2 may be 0.9*1.2*b;
- if U2 reports a login site P1 through the social application C1 on the device A3, where the third weight value of A3 with respect to U2 is 0.6, the first weight value of A3 is 0.9, the confidence level of P1 may be 0.9*0.6*a;
- if U3 reports a login site P3 through the payment application C3 on the device A1, where the third weight value of A1 with respect to U3 is 0.7, the confidence level of P3 may be 0.8*0.7*c; and
- if U3 reports a login site P2 through the social application C1 on the device A4, where the third weight value of A4 with respect to U3 is 0.5, the first weight value of A4 is 0.8, the confidence level of P2 may be 0.8*0.5*a.

In step S210, the server accumulates confidence levels in the login information that belong to the same login site, to obtain an accumulated confidence level, each login site corresponding to one accumulated confidence level.

For example, the accumulated confidence level Rank (P1)=1*1*a+1*0.8*c+0.9*0.6*a, Rank $(P2)=0.9*1.2*b+0.8*0.5*a$, and Rank $(P3)=0.8*0.7*c$.

S211. The server determines the login site corresponding to the largest accumulated confidence level as a target login site, and positions the to-be-positioned device according to the target login site.

For example, the target login site P may be Max (Rank (P1), Rank (P2), Rank (P3)), and it may be determined that a home area of the to-be-positioned device A1 is the target login site P.

It can be learned from the foregoing description that in the device positioning method provided in some embodiments, a server may obtain all user identifiers that log into a to-be-positioned device within a preset time. Next, the server calculates a total login duration of each user identifier on the to-be-positioned device within the preset time, and sorts the user identifiers according to a value of each total login duration. Next, the server obtains a preset quantity of top user identifiers in the sorted user identifiers as target user identifiers, establishes an association relationship between the target device identifier of the to-be-positioned device and each target user identifier, and stores the association relationship in an identifier library. After that, the server obtains a device positioning request, the device positioning request carrying a target device identifier of the to-be-positioned device. The server obtains, from the identifier library and according to the association relationship, each target user identifier corresponding to the target device identifier. Next, the server obtains at least one piece of login information reported by each target user identifier, each piece of login information including the target user identifier, a device identifier of a login device, an application identifier of a login application program, and a login site. The server obtains a first weight value of the corresponding target user identifier according to the device identifier in each piece of login information, obtains a second weight value of the corresponding application identifier according to the target user identifier in each piece of login information, and obtains a third weight value of the corresponding device identifier according to the target user identifier in each piece of login information. After that, the server calculates a confidence level of the corresponding login site according to the first weight value, the second weight value, and the third weight value corresponding to each piece of login information, and accumulates confidence levels in the login information that belong to the same login site, to obtain an accumulated confidence level, each login site corresponding to one accumulated confidence level. After that, the server determines the login site corresponding to the largest accumulated confidence level as a target login site, and positions the to-be-positioned device according to the target login site. Through the foregoing processing process, the server can position a device from three dimensions, for example, service data, a user factor, and a device factor, and high positioning accuracy is achieved.

According to the method described in the foregoing embodiment, this embodiment of this application provides further description from the perspective of a device positioning apparatus, and the device positioning apparatus may be integrated in a server.

Figure 3A:
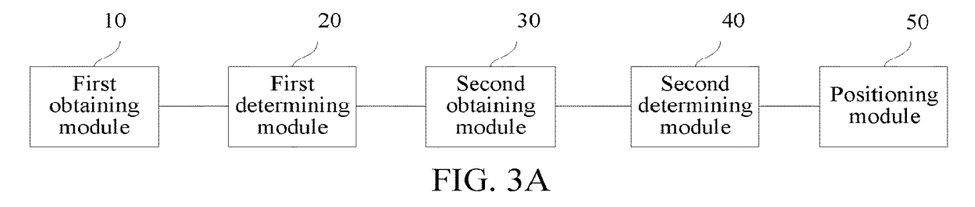
FIG. 3A is a schematic structural diagram of a device positioning apparatus according to an embodiment of this application.

FIG. 3A specifically describes a device positioning apparatus provided in an embodiment of this application, and the apparatus may include: a first obtaining module 10, a first determining module 20, a second obtaining module 30, a second determining module 40, and a positioning module 50.

(1) First Obtaining Module 10

The first obtaining module 10 is configured to obtain a device positioning request, the device positioning request carrying a target device identifier of a to-be-positioned device.

In some embodiments, the target device identifier (device identifier) is a unique identifier of the device, and may be an International Mobile Equipment Identity (IMEI) of the device, a device fingerprint, or a character string that is automatically allocated by a system to each device when an application program on the device is used. The device fingerprint herein is usually formed according to hardware information (such as a device brand or model) and network browsing information of each device, and different devices have different device fingerprints. For example, when a detection server in the system detects that a device reports different login sites to an application program server in a process of using different application programs, the device may be determined as a to-be-positioned device. In this case, the device positioning request may be generated and sent to the device positioning apparatus. The first obtaining module

10 in the device positioning apparatus obtains the device positioning request, to position the device.

(2) First Determining Module 20

The first determining module 20 is configured to determine at least one target user identifier according to the target device identifier.

In some embodiments, the target user identifier (user identifier) is an identifier for identifying a user, and the same user usually has different user identifiers in different application systems. The user identifier may be an account registered by a user on a server in an application system in a process of using an application program, or may be a character string allocated by the server in the application system to each user, or the like. The at least one target user identifier may be user identifiers of the same user in different application programs on the target device corresponding to the target device identifier, or may be user identifiers of different users in the same application program on the target device corresponding to the target device identifier.

For example, the first determining module 20 may be specifically configured to search an identifier library for each user identifier corresponding to the target device identifier as the target user identifier.

In some embodiments, identifiers in the identifier library may include user identifiers and device identifiers. The user identifiers may be associated with the device identifiers. Each device identifier may correspond to at least one user identifier, and each user identifier may correspond to at least one device identifier. Specific quantities may be determined according to an actual requirement.

Figure 3B:
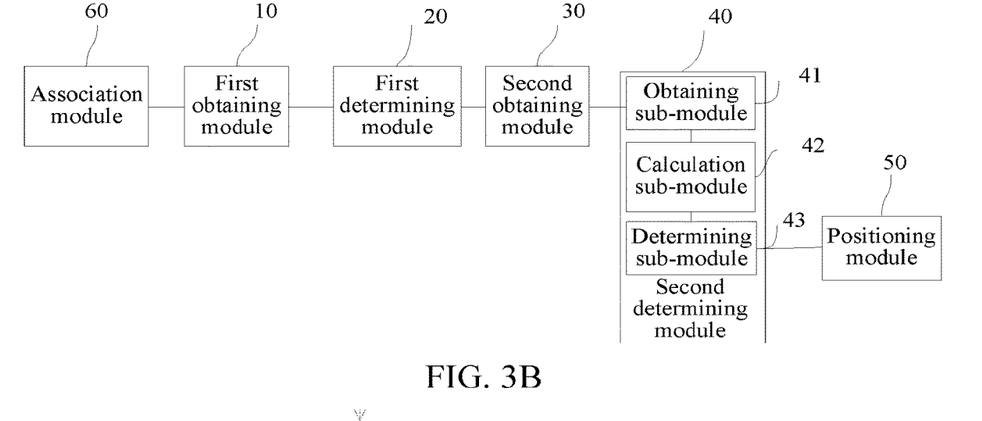
FIG. 3B is a schematic structural diagram of another device positioning apparatus according to an embodiment of this application.

For example, the identifier library may be set in advance, and may also be referred to as a database. That is, referring to FIG. 3B, the device positioning apparatus may further include an association module 60, configured to: perform the following steps before the at least one target user identifier is determined according to the target device identifier:

In step 1-1, obtain all user identifiers that log into the to-be-positioned device within a preset time.

In some embodiments, the preset time may be determined according to an actual requirement. For example, the preset time may be one month or two months. Generally, the server may automatically record a status each time a user logs into an application system, for example, a login device, a login period, a login account, and a login application program, and store the recorded status in the identifier library. The device positioning apparatus may obtain, from the identifier library, all user identifiers that log into the to-be-positioned device within the preset time.

In step 1-2, determine one or more candidate user identifiers from the user identifiers.

For example, the association module 60 may be further configured to calculate a total login duration of each user identifier on the to-be-positioned device within the preset time, sort the user identifiers according to a value of each total login duration, and obtain a preset quantity of top user identifiers in the sorted user identifiers as the one or more candidate user identifiers.

In some embodiments, the preset quantity may be determined according to an actual requirement, for example, 3 or 4. For example, the association module 60 may add up all login periods of a particular user identifier within the preset time, to obtain a total login duration of the user identifier, and then determine user identifiers with total login durations ranked in the front several positions as the target user identifiers. Generally, a user identifier with a longer total login duration is more likely a user identifier of an owner of the to-be-positioned device, for example, a user identifier of a main user of the to-be-positioned device. Login statuses (which are mainly login sites) of the user identifiers have an important reference value in the subsequent process of determining a home area of the device.

In step 1-3, establish an association relationship between the target device identifier and each of the one or more candidate user identifiers, and store the association relationship in the identifier library.

In some embodiments, each device identifier may be associated with a plurality of user identifiers. Each user identifier is a main use identifier of a device indicated by the device identifier. The user identifiers may be registered accounts of the same user or different users on different application programs. The different application programs are usually developed by one operator.

In this case, the first determining module 20 may be further configured to obtain, from the identifier library and according to the association relationship between the target device identifier and each target user identifier, each user identifier corresponding to the target device identifier as the target user identifier.

In some embodiments, the association module 60 associates the device identifier of each device with corresponding user identifiers, so that the first determining module 20 can find a corresponding user identifier according to a device identifier subsequently.

(3) Second Obtaining Module 30

The second obtaining module 30 is configured to obtain at least one piece of login information reported by each target user identifier, where each piece of login information may include the target user identifier, a device identifier of a login device, and a login site In some embodiments, the login information mainly refers to information related to user login, for example, a login account (that is, a login user identifier), a login device, a login application program, a login period, and a login site. The login site may be a positioning site of a built-in GPS of the device, or may be a site obtained according to an IP address of the device. The login site may be specifically determined according to an actual requirement. Generally, considering that GPS information cannot be forged easily, the second obtaining module 30 may use a GPS positioning site as the login site. In an example, the login site is determined according to the IP address only when a GPS function cannot be used.

(4) Second Determining Module 40

The second determining module 40 is configured to determine a target login site according to the target user identifier and the device identifier in each piece of login information.

For example, the second determining module 40 may specifically include an obtaining sub-module 41, a calculation sub-module 42, and a determining sub-module 43.

The obtaining sub-module 41 is configured to obtain a first weight value of the corresponding target user identifier according to the device identifier in each piece of login information.

In some embodiments, the first weight value is mainly used for indicating a degree of importance of each user identifier with respect to a device, and may be set in advance according to a use frequency and/or a login duration of each user identifier on the same device. Generally, for different user identifiers appearing on the same device, a higher use frequency or a longer login duration of a user identifier indicates that the user identifier is more important for the device, for example, the first weight value is greater.

The calculation sub-module 42 is configured to calculate a confidence level of the corresponding login site according to the first weight value corresponding to each piece of login information.

In some embodiments, the confidence level mainly refers to a degree of credibility that a site where the device is located (that is, a home area) is the corresponding login site. The confidence level may be determined in many manners. For example, the confidence level may be directly calculated according to the first weight value, for example, the confidence level is directly calculated according to the use frequency and login duration of each user identifier on the device. Generally, a login site corresponding to a user identifier with a higher use frequency or a longer login period has a higher level of confidence of being the home area of the device. Therefore, the home area of the device may be determined according to login statuses of a plurality of users on the same device. Compared with a related method of determining a home area of a device merely according to a login status of a single user, the device positioning apparatus in some embodiments can effectively avoid the problem of a positioning error caused by forged login information of a single user, thereby improving the accuracy of positioning.

Definitely, to further ensure the accuracy of positioning, positioning may be performed from multiple dimensions. For example, the confidence level may be calculated with reference to service data of services that the device participates in. That is, the login information may further include an application identifier of a login application program. In this case, the calculation sub-module 42 may specifically include an obtaining unit and a calculation unit.

The obtaining unit is configured to obtain a second weight value of the corresponding application identifier according to the target user identifier in each piece of login information.

In some embodiments, the application identifier is a unique identifier of an application program, and may be a name of the application program. Different application programs have different application identifiers. The second weight value is mainly used for indicating a degree of importance of each application program with respect to a user, and may be set in advance according to a factor (such as a usage habit) of the user. For example, a second weight value of an application program used more frequently may be set to a larger value. Definitely, the second weight value may also be set with reference to a factor of the application program (for example, a real name degree). Generally, login information reported by an application program with a higher real name degree is more difficult to forge, and has a higher reference value for determining a home area of the device. Therefore, the second weight value may be directly proportional to the real name degree. For example, for application programs with gradually descending real name degrees, such as a payment-type application program, a social-type application program, and a video-type application program, weight values thereof may also be set in descending order.

Because different users have different usage habits, for the same application program, different users have different second weight values. In addition, the second weight value not only can be determined according to the factor of the user or the factor of the user and the factor of the application program, but also can be determined according to the factor of the application program directly, and in this case, for the same application program, different users have the same second weight value.

The calculation unit is configured to calculate the confidence level of the corresponding login site according to the first weight value and the second weight value corresponding to each piece of login information.

In some embodiments, the target login site may be directly determined according to the login information reported by the target user identifier in the to-be-positioned device, or the target login site may be determined with reference to login information reported by target user identifiers in other devices. Definitely, there may also be other determining manners. The calculation method may be determined according to an actual requirement. For example, the calculation method may be simple multiplication, addition, and the like.

For example, when the target login site is determined merely according to the login information reported by the to-be-positioned device, the calculation unit may be specifically configured to obtain the login information corresponding to the target device identifier as target login information, and calculate the confidence level of the corresponding login site according to the first weight value and the second weight value corresponding to each piece of target login information.

In some embodiments, each target user identifier may report login sites in a plurality of devices. Therefore, when a home area of the to-be-positioned device needs to be analyzed, the target login site may be directly determined according to the login information reported by the to-be-positioned device. That is, the login information is directly determined according to the second weight value of the login application program in the target login information and the first weight value of the login user. This determining method combines two dimensions, for example, service data and a user factor, and is more accurate in positioning compared with a single-dimensional determining method. Moreover, this determining method helps implement data sharing between different services and breaks down information barriers.

In addition, when the target login site is determined according to login information reported by target user identifiers in the to-be-positioned device and other devices, the calculation unit may be specifically configured to obtain a third weight value of the corresponding device identifier according to the target user identifier in each piece of login information, and calculate the confidence level of the corresponding login site according to the first weight value, the second weight value, and the third weight value corresponding to each piece of login information.

In some embodiments, the third weight value is mainly used for indicating a degree of importance of each device with respect to a user, and may be set in advance according to a login frequency and/or a login duration of the same user identifier on each device. Generally, for the same user identifier, a third weight value of a mainly used device (for example, a device that is logged into for the most number of times or logged in for the longest duration) may be set to a relatively large value, and a device not mainly used (for example, a device that is logged into only once) may be set to a relatively small value. This determining method implements positioning by combining three dimensions, for example, service data, a user factor, and a device factor, and can effectively distinguish false login information and improve the accuracy of device positioning.

The third weight value is set in advance according to a historical login status of each user identifier on each device. Therefore, a user identifier may log into a new device subsequently. In this case, because historical login devices do not include the new device, the corresponding third weight value cannot be obtained. In such a case, the third weight value of each new device may be 0 or a relatively small fixed value by default.

The determining sub-module 43 is configured to determine the target login site according to the confidence level of each login site.

For example, the determining sub-module 43 may be specifically configured to accumulate confidence levels in the login information that belong to the same login site to obtain an accumulated confidence level, each login site corresponding to one accumulated confidence level and determine the login site corresponding to the largest accumulated confidence level as the target login site.

In some embodiments, the determining sub-module 43 may add up all confidence levels corresponding to the same login site to obtain a total confidence level (that is, the accumulated confidence level). A larger value of the confidence level indicates that the login site is more likely a current site (that is, the home area) of the to-be-positioned device. Therefore, the login site corresponding to the largest confidence level may be directly determined as the target login site.

(5) Positioning Module 50

The positioning module 50 is configured to position the to-be-positioned device according to the target login site.

In some embodiments, the positioning module 50 may directly determine the target login site as the current site of the to-be-positioned device, thereby implementing precise positioning of the to-be-positioned device. In addition, the server may further preliminarily determine login information, in which the login site is not the target login site, as false information, thereby effectively preventing lawbreakers from forging geographic location information to seek illegal interests from services, for example, carry out brushing, fraud, and pornographic fake chatting. Therefore, a good network environment can be maintained.

During specific implementation, the foregoing units may be implemented as independent entities, and may also be combined randomly to be implemented as the same or several entities. For specific implementation of the foregoing units, reference can be made to the foregoing method embodiments. Details are not described herein again.

It can be learned from foregoing description that in the device positioning apparatus provided in some embodiments, the first obtaining module 10 obtains a device positioning request, the device positioning request carrying a target device identifier of a to-be-positioned device; then, the first determining module 20 determines at least one target user identifier according to the target device identifier, and the second obtaining module 30 obtains at least one piece of login information reported by each target user identifier, each piece of login information including the target user identifier, a device identifier of a login device, and a login site; then, the second determining module 40 determines a target login site according to the target user identifier and the device identifier in each piece of login information, and the positioning module 50 positions the to-be-positioned device according to the target login site. Therefore, device positioning can be implemented from multiple dimensions, and high accuracy is achieved.

Correspondingly, an embodiment of this application further provides a device positioning system, including any device positioning apparatus provided in the embodiments of this application. The device positioning apparatus may be integrated in a server.

The server may obtain a device positioning request, the device positioning request carrying a target device identifier of a to-be-positioned device; determine at least one target user identifier according to the target device identifier; obtain at least one piece of login information reported by each target user identifier, each piece of login information including the target user identifier, a device identifier of a login device, and a login site; and determine a target login site according to the target user identifier and the device identifier in each piece of login information; and position the to-be-positioned device according to the target login site.

For specific implementation of the foregoing devices, reference can be made to the foregoing embodiments. Details are not described herein again.

The device positioning system may include any device positioning apparatus provided in the embodiments of this application, and therefore may implement beneficial effects that can be achieved by any device positioning apparatus provided in the foregoing embodiments of this application. For details, refer to the foregoing embodiments. Details are not described herein again.

Figure 4:
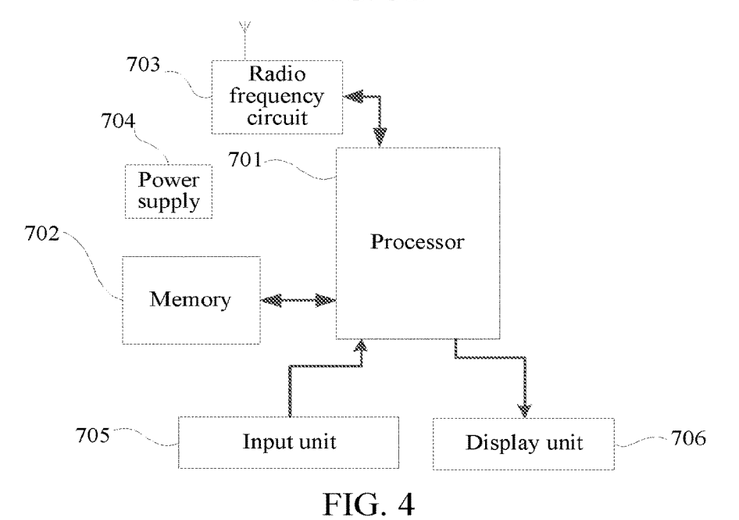
FIG. 4 is a schematic diagram of a server according to an embodiment of this application.

An embodiment of this application further provides a server. As shown in FIG. 4, FIG. 4 is a schematic structural diagram of a server related to an embodiment of this application.

Specifically, the server may include a processor 701 with one or more processing cores, a memory 702 with one or more computer readable storage media, a radio frequency (RF) circuit 703, a power supply 704, an input unit 705, a display unit 706, and other components. The structure of the server shown in FIG. 4 does not limit the server. The server may include more or fewer components than those shown in FIG. 4, or some components may be combined, or a different component deployment may be used.

The processor 701 is a control center of the server, and connects to various parts of the whole server by using various interfaces and lines. By running or executing a software program and/or module stored in the memory 702, and invoking data stored in the memory 702, the processor 701 performs various functions and data processing of the server, thereby performing overall monitoring on the server. Optionally, the processor 701 may include one or more processing cores. The processor 701 may integrate an application processor and a modem processor. The application processor mainly processes an operating system, a user interface, an application program, and the like. The modem processor mainly processes wireless communication. It may be understood that, the foregoing modem processor may not be integrated into the processor 701.

The memory 702 may be configured to store a software program and module. The processor 701 runs the software program and module stored in the memory 702, to implement various functional applications and data processing. The memory 702 may mainly include a program storage area and a data storage area. The program storage area may store an operating system, an application program used by at least one function (such as a sound playback function and an image playback function), and the like. The data storage area may store data created according to use of the server, and the like. In addition, the memory 702 may include a high speed random access memory, and may also include a non-volatile memory, such as at least one magnetic disk storage device, a flash memory, or another volatile solid storage device. Accordingly, the memory 702 may further include a memory controller, so that the processor 701 accesses the memory 702.

The RF circuit 703 may be configured to receive and send a signal during an information receiving and sending process. Specifically, the RF circuit 703 receives downlink information from a base station, then delivers the downlink information to one or more processors 701 for processing, and sends related uplink data to the base station. Generally, the RF circuit 703 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 703 may also communicate with a network and another device by wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The server further includes the power supply 704 (such as a battery) for supplying power to the components. The power supply 704 may logically connect to the processor 701 by using a power supply management system, thereby implementing functions, such as charging, discharging, and power consumption management, by using the power supply management system. The power supply 704 may further include any component, such as one or more direct current or alternate current power supplies, a re-charging system, a power supply fault detection circuit, a power supply converter or an inverter, and a power supply state indicator.

The server may further include the input unit 705. The input unit 705 may be configured to receive input digit or character information, and generate keyboard, mouse, joystick, optical, or track ball signal input related to the user setting and function control. Specifically, in a specific embodiment, the input unit 705 may include a touch-sensitive surface and another input device. The touch-sensitive surface may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 701. Moreover, the touch controller can receive and execute a command sent from the processor 701. In addition, the touch-sensitive surface may be implemented by using various types, such as a resistive type, a capacitance type, an infrared type, and a surface acoustic wave type. In addition to the touch-sensitive surface, the input unit 705 may further include another input device. Specifically, the another input device may include, but is not limited to, one or more of a physical keyboard, a functional key (such as a volume control key or a switch key), a track ball, a mouse, and a joystick.

The server may further include the display unit 706. The display unit 706 may be configured to display information input by the user or information provided for the user, and various graphical user interfaces of the server. The graphical user interfaces may be formed by a graph, a text, an icon, a video, and any combination thereof. The display unit 706 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 701, so as to determine a type of a touch event. Then, the processor 701 provides corresponding visual output on the display panel according to the type of the touch event. Although, in FIG. 4, the touch-sensitive surface and the display panel are used as two independent parts to implement input and output functions, in some embodiments, the touch-sensitive surface and the display panel may be integrated to implement the input and output functions.

Although not shown in the figure, the server may further include a camera, a Bluetooth module, and the like, which are not further described herein. Specifically, in some embodiments, the processor 701 in the server loads an executable file corresponding to a process of one or more application program into the memory 702, and the processor 701 runs the application program stored in the memory 702 to implement the device positioning method described in the disclosure.

The server may implement effective effects that can be achieved by any device positioning apparatus provided in the embodiments of this application. For details, refer to the foregoing embodiments. Details are not described herein again.

A person of ordinary skill in the art may understand that all or some of the steps of the methods in the foregoing embodiments may be implemented by a program instructing relevant hardware. The program may be stored in a computer readable storage medium. The storage medium may include a read-only memory (ROM), a random access memory (RAM), a magnetic disk, an optical disc, or the like.

The device positioning method, apparatus and system provided in the embodiments of this application are described in detail. The principles and implementations of this application are described through specific examples in this specification, and the descriptions of the foregoing embodiments are only intended to help understand the method and core ideas of this application. Meanwhile, a person skilled in the art may make modifications to the specific implementations and application scopes according to the ideas of this application. In conclusion, the content of the specification should not be construed as a limitation to this application.

What is claimed is:

1. A device positioning method, comprising:
   obtaining a positioning request, the positioning request including a target device identifier (ID) of a target device to be positioned, the target device being associated with a plurality of user IDs;
   determining, from the plurality of user IDs, at least one target user ID of the plurality of user IDs that uses the target device to be positioned, the at least one target user ID having a greater login frequency than other user IDs of the plurality of user IDs;
   obtaining a plurality of pieces of login information of the at least one target user ID, each piece of login information including the respective target user ID, a device ID of a login device, a login site, and an application ID of an application program, the application ID being weighted in accordance with a likelihood that the at least one target user ID is not forged;

determining a target login site based on the plurality of pieces of login information; and positioning the target device according to the target login site.

2. The device positioning method according to claim 1, wherein the determining the target login site further comprises:

for each piece of login information that includes the respective target user ID, the device ID, and the login site, obtaining, based on the device ID, a first weight for the target user ID, the first weight indicating the login device being used by a set of user IDs including the target user ID; and calculating, according to the first weight, a credibility level of the respective login site associated with the respective piece of login information; and determining the target login site according to the credibility levels of the respective login sites associated with the plurality of pieces of login information.

3. The device positioning method according to claim 2, wherein the determining the target login site further comprises:

for each login site that is included in one or more of the plurality of pieces of login information, determining a combined credibility level based on the credibility levels of the respective login sites associated with the one or more of the plurality of pieces of login information; and selecting the login site corresponding to a largest combined credibility level from the determined combined credibility levels as the target login site.

4. The device positioning method according to claim 2, wherein the calculating the credibility level for the respective piece of login information further includes:
obtaining, based on the target user ID, a second weight for the respective application ID; and
calculating the credibility level according to the first weight and the second weight.

5. The device positioning method according to claim 4, wherein the plurality of pieces of login information includes one or more pieces of target login information, the login device of the one or more pieces of target login information being the target device; and the calculating the credibility level further includes calculating the credibility level of the respective login site according to the first weight and the second weight for each of the one or more pieces of target login information.

6. The device positioning method according to claim 4, wherein the calculating the credibility level for the respective piece of login information according to the first weight and the second weight further comprises:
obtaining, based on the target user ID, a third weight for the device ID, the third weight indicating the target user ID using a set of devices including the login device; and
calculating the credibility level of the respective login site according to the first weight, the second weight, and the third weight.

7. The device positioning method according to claim 1, before the determining the at least one target user ID, further comprising:

obtaining multiple user IDs that log into the target device within a preset time;

determining one or more candidate user IDs from the multiple user IDs based on usage of the target device by the one or more candidate user IDs;

establishing an association relationship between the target device ID and the one or more candidate user IDs; and storing the association relationship in an identifier library.

8. The device positioning method according to claim 7, wherein the determining the at least one target user ID further comprises:

obtaining, according to the association relationship in the identifier library, the one or more candidate user IDs associated with the target device ID, the one or more candidate user IDs being the at least one target user ID.

9. The device positioning method according to claim 8, wherein the determining the one or more candidate user IDs further comprises:

calculating a login duration of each of the multiple user IDs on the target device within the preset time;

sorting the multiple user IDs according to the respective login durations; and determining the one or more candidate user IDs corresponding to N longest login durations in the sorted multiple user IDs, N being a positive integer.

10. The method according to claim 1, wherein when the application program is a payment type application program, the application ID is associated with a higher weight than a weight for an application ID for a social networking type application program.

11. A device positioning apparatus, comprising:
processing circuitry configured to:
obtain a positioning request, the positioning request including a target device identifier (ID) of a target device to be positioned, the target device being associated with a plurality of user IDs;
determine, from the plurality of user IDs, at least one target user ID of the plurality of user IDs that uses the target device to be positioned, the at least one target user ID having a greater login frequency than other user IDs of the plurality of user IDs;
obtain a plurality of pieces of login information of the at least one target user ID, each piece of login information including the respective target user ID, a device ID of a login device, a login site, and an application ID of an application program, the application ID being weighted in accordance with a likelihood that the at least one target user ID is not forged;
determine a target login site based on the plurality of pieces of login information; and
position the target device according to the target login site.

12. The device positioning apparatus according to claim 11, wherein the processing circuitry is further configured to:
for each piece of login information that includes the respective target user ID, the device ID, and the login site, obtain, based on the device ID, a first weight for the target user ID, the first weight indicating the login device being used by a set of user IDs including the target user ID;
calculate, according to the first weight, a credibility level of the respective login site associated with the respective piece of login information; and
determine the target login site according to the credibility levels of the respective login sites associated with the plurality of pieces of login information.

13. The device positioning apparatus according to claim 12, wherein the processing circuitry is further configured to:

for each login site that is included in one or more of the plurality of pieces of login information, determine a combined credibility level based on the credibility levels of the respective login sites associated with the one or more of the plurality of pieces of login information; and select the login site corresponding to a largest combined credibility level from the determined combined credibility levels as the target login site.

14. The device positioning apparatus according to claim 12, wherein
the processing circuitry is further configured to:
obtain, based on the target user ID, a second weight for the respective application ID; and
calculate the credibility level according to the first weight and the second weight.

15. The device positioning apparatus according to claim 14, wherein
the plurality of pieces of login information includes one or more pieces of target login information, the login device of the one or more pieces of target login information being the target device; and
the processing circuitry is further configured to calculate the credibility level of the respective login site according to the first weight and the second weight for each of the one or more pieces of target login information.

16. The device positioning apparatus according to claim 14, wherein the processing circuitry is further configured to:
obtain, based on the target user ID, a third weight for the device ID, the third weight indicating the target user ID using a set of devices including the login device; and
calculate the credibility level of the respective login site according to the first weight, the second weight, and the third weight.

17. The device positioning apparatus according to claim 11, wherein the processing circuitry is further configured to:
obtain a device positioning request that includes a target device ID for the target device; and
determine the at least one target user ID based on the target device ID.

18. The device positioning apparatus according to claim 17, wherein the processing circuitry is further configured to:
obtain multiple user IDs that log into the target device within a preset time;
determine one or more candidate user IDs from the multiple user IDs based on usage of the target device by the one or more candidate user IDs;
establish an association relationship between the target device ID and the one or more candidate user IDs; and
store the association relationship in an identifier library.

19. The device positioning apparatus according to claim 18, wherein the processing circuitry is further configured to obtain, according to the association relationship in the identifier library, the one or more candidate user IDs associated with the target device ID, the one or more candidate user IDs being the at least one target user ID.

20. A non-transitory computer-readable medium storing a program executable by a processor to perform:
obtaining a positioning request, the positioning request including a target device identifier (ID) of a target device to be positioned, the target device being associated with a plurality of user IDs;
determining, from the plurality of user IDs, at least one target user ID of the plurality of user IDs that uses the target device to be positioned, the at least one target user ID having a greater login frequency than other user IDs of the plurality of user IDs;
obtaining a plurality of pieces of login information of the at least one target user ID, each piece of login information including the respective target user ID, a device ID of a login device, a login site, and an application ID of an application program, the application ID being weighted in accordance with a likelihood that the at least one target user ID is not forged;
determining a target login site based on the plurality of pieces of login information; and
positioning the target device according to the target login site.

* * * * *